(12) United States Patent
Knueven et al.

(10) Patent No.: US 9,095,115 B1
(45) Date of Patent: Aug. 4, 2015

(54) ANIMAL HOUSE HAVING AMMONIA CONTROL APPARATUS

(71) Applicant: Jones-Hamilton Co., Walbridge, OH (US)

(72) Inventors: Carl J. Knueven, Bowling Green, OH (US); Michael W. Dunn, Northwood, OH (US)

(73) Assignee: JONES-HAMILTON CO., Walbridge, OH (US)

( * ) Notice: Subject to any disclaimer, the term of this patent is extended or adjusted under 35 U.S.C. 154(b) by 0 days.

(21) Appl. No.: 14/457,550

(22) Filed: Aug. 12, 2014

Related U.S. Application Data

(60) Provisional application No. 61/864,798, filed on Aug. 12, 2013.

(51) Int. Cl.
*A01K 1/00* (2006.01)
*A01K 31/18* (2006.01)
*A61L 9/00* (2006.01)
*A61L 9/14* (2006.01)

(52) U.S. Cl.
CPC ............... *A01K 1/0047* (2013.01); *A01K 31/18* (2013.01)

(58) Field of Classification Search
CPC ....... A01K 1/00; A01K 31/18; A01K 1/0047; A61L 9/00; A61L 9/14; F24F 3/16
See application file for complete search history.

(56) References Cited

U.S. PATENT DOCUMENTS

| | | | |
|---|---|---|---|
| 5,176,879 A | 1/1993 | White et al. | |
| 5,622,697 A | 4/1997 | Moore, Jr. | |
| 5,833,970 A | 11/1998 | Cox | |
| 5,865,143 A | 2/1999 | Moore, Jr. | |
| 5,914,104 A | 6/1999 | Moore, Jr. | |
| 5,928,403 A | 7/1999 | Moore, Jr. | |
| 5,945,333 A | 8/1999 | Rehberger | |
| 5,960,743 A | 10/1999 | Taylor | |
| 5,961,968 A | 10/1999 | Moore, Jr. | |
| 8,181,604 B1 * | 5/2012 | Avila | 119/448 |
| 8,663,551 B1 * | 3/2014 | Moore, Jr. | 422/4 |
| 2006/0118058 A1 * | 6/2006 | Moore, Jr. | 119/448 |
| 2009/0020016 A1 * | 1/2009 | Christophersen et al. | 96/224 |
| 2009/0301402 A1 * | 12/2009 | Devine et al. | 119/447 |
| 2009/0324504 A1 * | 12/2009 | Sen | 424/43 |
| 2014/0000527 A1 * | 1/2014 | Martin | 119/448 |
| 2014/0338539 A1 * | 11/2014 | Park | 96/324 |

FOREIGN PATENT DOCUMENTS

| | | | | |
|---|---|---|---|---|
| ES | 2250900 T3 * | 4/2006 | ........... | A01K 1/0047 |
| JP | 5246472 B2 * | 7/2013 | ........... | A61L 2/22 |
| NL | 9201642 A * | 4/1994 | ........... | A01K 1/0151 |
| WO | WO 2014053138 A2 * | 4/2014 | ........... | A01K 1/0047 |

* cited by examiner

*Primary Examiner* — Timothy Vanoy
(74) *Attorney, Agent, or Firm* — MacMillan, Sobanski & Todd, LLC

(57) ABSTRACT

An animal house has ammonia control apparatus. The animal house is a building structured for housing one or more animals. Apparatus is positioned inside the animal house for removing ammonia from air, and then returning the air inside the animal house. A method for removing ammonia from air in an animal house includes removing ammonia from air with an apparatus positioned inside the animal house, and then returning the air with ammonia removed inside the animal house.

20 Claims, 3 Drawing Sheets

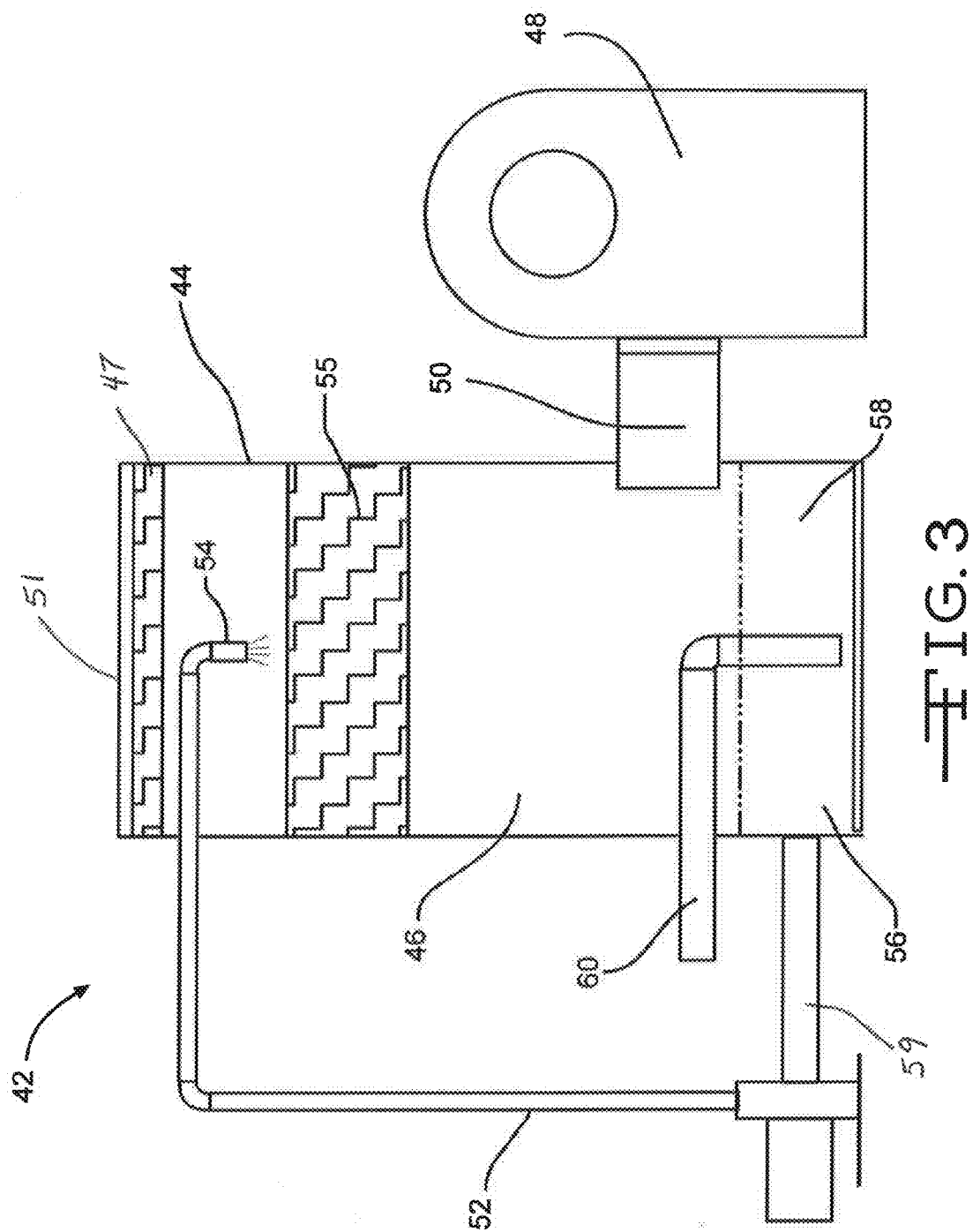

ANIMAL HOUSE HAVING AMMONIA CONTROL APPARATUS

CROSS-REFERENCE TO RELATED APPLICATION

This application claims the benefit of U.S. Provisional Application No. 61/864,798, filed Aug. 12, 2013, the disclosure of which is incorporated herein by reference.

BACKGROUND OF THE INVENTION

This invention relates in general to methods of controlling undesirable gases in the environment, and in particular to an apparatus and method to remove ammonia from the air in an animal house such as a chicken house.

In animal agriculture operations, ammonia is generated as animal wastes break down. The ammonia can be harmful to the health and growth rate of animals, and ammonia emissions to the atmosphere are an environmental concern. To address these problems, different methods have been used to control the ammonia.

One method is to apply a chemical to the animal waste to control ammonia emissions. For example, in the production of broiler chickens it is known to apply a chemical such as sodium bisulfate, aluminum sulfate, iron sulfate or sulfuric acid to the litter on the floor of a chicken house. When ammonia from the chicken waste comes into contact with the chemical it reacts and is changed into solid ammonium sulfate and as a result it is not emitted into the air as gaseous ammonia.

Another method is to exhaust air containing ammonia from the animal house and introduce fresh air. The air exhausted from the house can be scrubbed or filtered to remove the ammonia before it is introduced to the environment.

There is still a need for an improved apparatus and method of controlling ammonia in animal agriculture operations.

SUMMARY OF THE INVENTION

An animal house has ammonia control apparatus. The animal house is a building structured for housing one or more animals. Apparatus is positioned inside the animal house for removing ammonia from air, and then returning the air inside the animal house.

A method for removing ammonia from air in an animal house includes removing ammonia from air with an apparatus positioned inside the animal house, and then returning the air with ammonia removed inside the animal house.

BRIEF DESCRIPTION OF THE DRAWINGS

FIG. 3 is a schematic cross-sectional view of an alternative embodiment of apparatus for removing ammonia from the air.

DETAILED DESCRIPTION OF THE PREFERRED EMBODIMENT

The present invention relates to an apparatus and method to remove ammonia from the air, and in a particular embodiment to remove ammonia from the air in an animal house.

The animal house can be any type of building structured for housing one or more animals. In certain embodiments, it is structured for housing multiple animals in an animal agriculture operation. Some examples of animals that can be raised in such operations include poultry, other birds, pigs, cows, sheep and horses. The poultry can include chickens, turkeys, ducks and geese. The chickens can be chickens farmed for meat (called "broilers") or egg-laying hens.

Various structures of different types of animal houses are known, and they can vary depending on the animal, the type of agriculture operation, the country and different regions of a country. In certain embodiments, the animal house is a chicken house for broilers or hens. Houses for broilers often are either wood frame structures (having a wood frame, enclosed side walls and a roof) or pole structures (having poles for a frame, open sides and a roof). They often are generally rectangular enclosures, and the interior may be continuous and extend the entire length and width of the house, or it may be divided into separate parts/chambers of the house.

A broiler house usually includes a floor which consists of hard flooring covered by a layer of litter. The hard flooring may be, for example, packed dirt/earth (a "pad") or concrete. The litter may be, for example, wood shavings, sawdust, rice hulls or peanut shells. A broiler house includes equipment for feeding and watering the broilers, and it often includes climate control and ventilation equipment. A house for egg-laying hens often includes multiple cages for the hens, which may be stacked in rows inside the house.

The apparatus for removing ammonia from air according to the invention is positioned inside the animal house. It takes in air from the interior of the house, processes the air to remove ammonia, and then returns the air having the ammonia removed inside the house. Consequently, there is no need to ventilate ammonia-containing air from the interior to the exterior of the house, as is common in many current animal houses. This saves on heating costs because heat is not lost to the exterior through a ventilation system.

In certain embodiments, the apparatus and method include detecting the level of ammonia in the air of the animal house and processing the air to keep the ammonia level below a predetermined level, for example at a level below 25 ppm.

Figure 1:
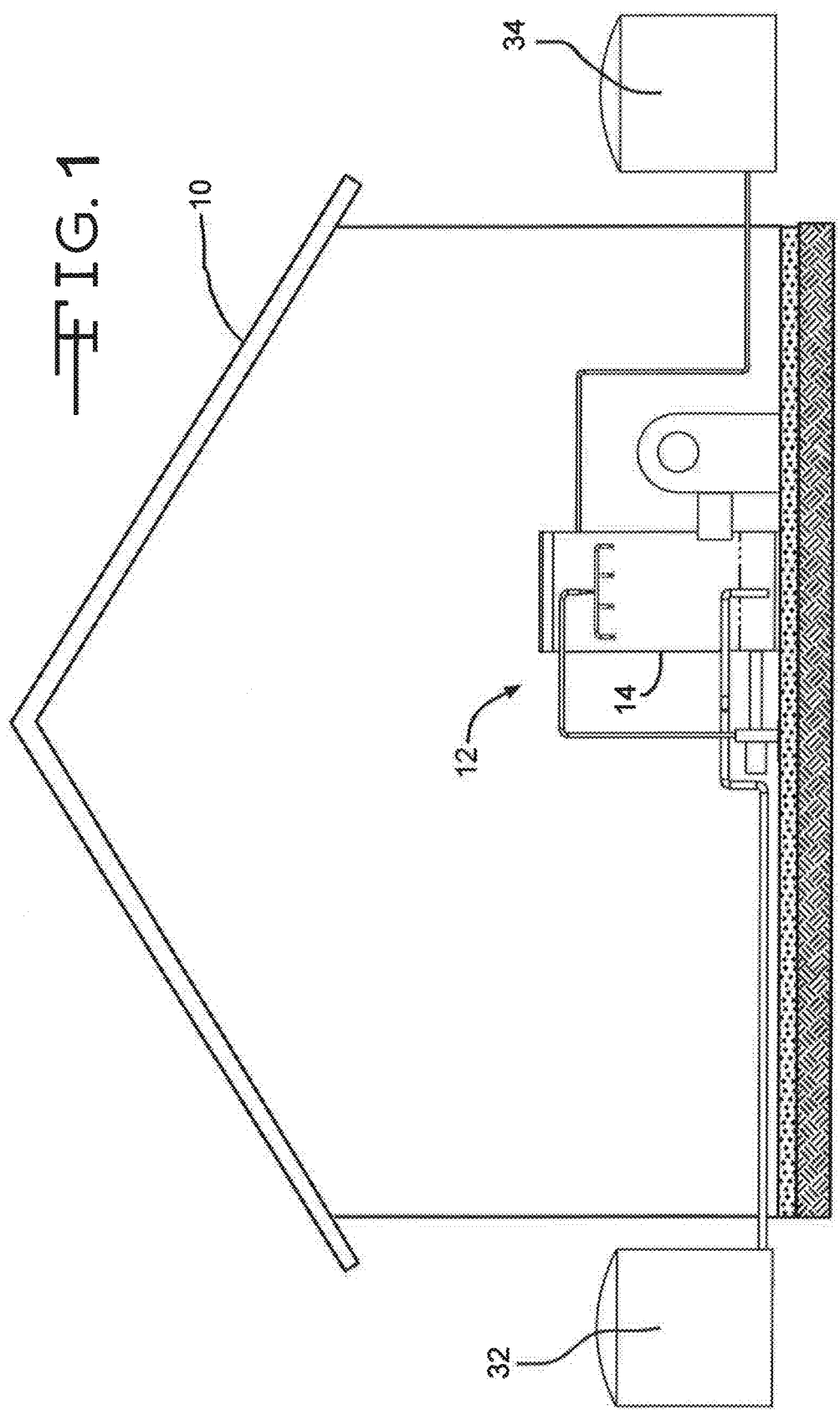
FIG. 1 is a schematic view of a chicken house having an apparatus according to the invention installed in the house to remove ammonia from the air.

Referring now to the drawings, there is illustrated in FIG. 1 a chicken house 10 having an apparatus 12 according to the invention installed in the house to remove ammonia from the air. The apparatus 12 can be installed at any suitable location in the house 10. For example, it may be positioned on the floor or mounted in a raised position. In certain embodiments, multiple apparatuses are installed in an animal house. For example, a chicken house may include three, four or more of the apparatuses depending on the size of the house and the level of ammonia.

The apparatus 12 can process the ammonia-containing air to remove ammonia by any suitable means or mechanism, and with any suitable structure of the apparatus. In certain embodiments, the ammonia is removed by use of a reaction that removes the ammonia from the air, and the reaction takes place in a reactor of the apparatus. FIG. 1 shows an example of one design of a reactor 14 for removing ammonia from the air inside the house. The apparatus 12 and reactor 14 are described in more detail hereinbelow. Many different designs of chemical reactors are disclosed in Perry's Chemical Engineer's Handbook, Eighth Edition. For example, the Handbook discloses different designs of gas/liquid chemical reactors.

Figure 2:
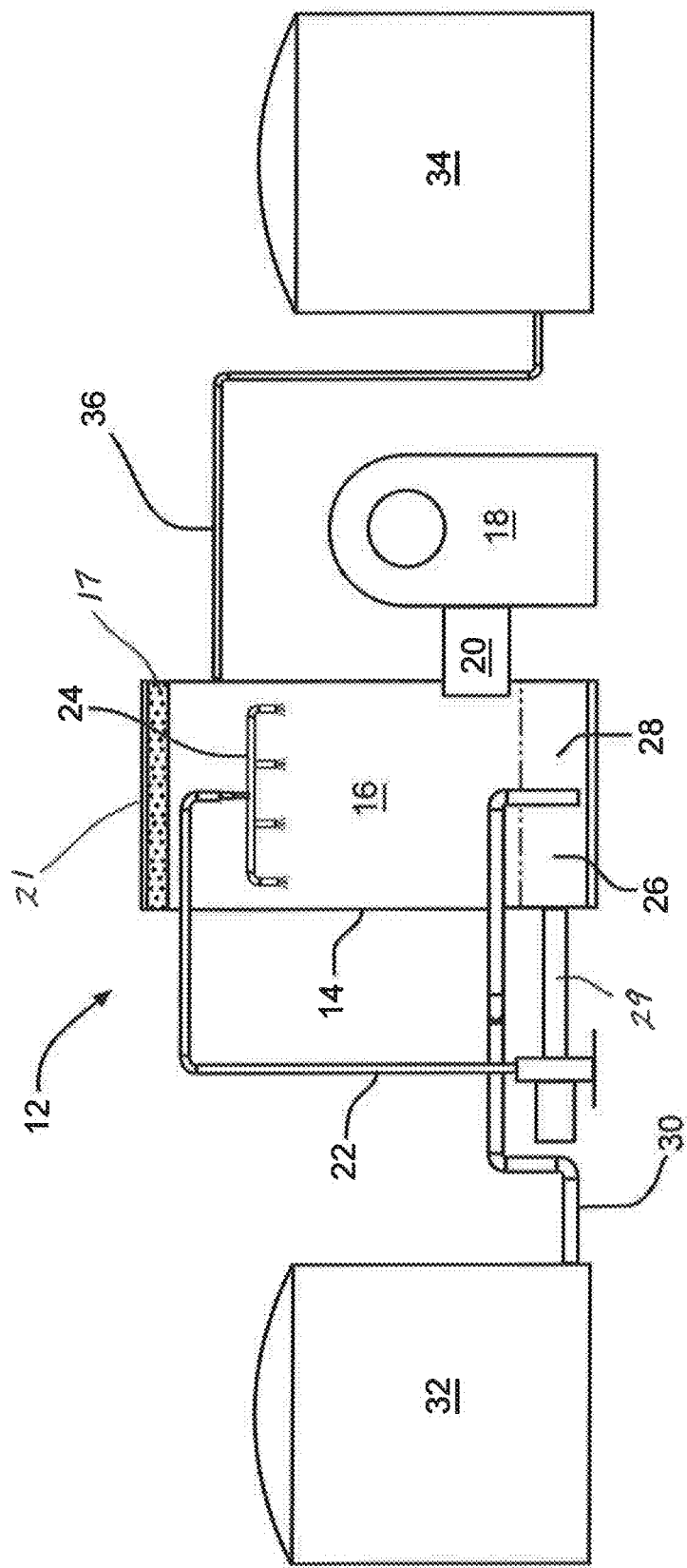
FIG. 2 is a schematic cross-sectional view of the apparatus for removing ammonia from the air.

As shown in FIG. 2, the apparatus 12 is a particular example of a design that can be used in the invention, but it is understood that many alternative embodiments of the design could be used. The apparatus 12 includes the reactor 14. The reactor 14 can have any suitable structure and size. In the example shown, the reactor 14 is a relatively small tower-type reactor. The reactor 14 has an interior 16 in which the chemical reaction takes place to remove ammonia from the air. In the example shown, the reactor 14 also has a demister pad 17 positioned inside the top of the reactor to separate droplets of liquid from air/liquid vapor produced by the reaction. Any type of demister can be used.

In certain embodiments, the apparatus 12 also includes a device for increasing the flow of air through the apparatus, for example, by drawing or propelling the air through the apparatus. In the embodiment shown, the apparatus 12 includes a fan 18 that draws in ammonia-containing air from the interior of the animal house and propels it through a duct 20 into the reactor 14. Many different designs of fans are known that could be used in the apparatus.

In the embodiment shown, the top 21 of the reactor 14 is open to the environment, not closed. The air flows from the duct 20 upward through the interior 16 of the reactor and exits the top 21 after reacting with the acid solution. Alternatively, the top of the reactor could be closed and the apparatus constructed with a different exit for the air (not shown).

In the example shown, the ammonia is removed from the air by contacting the air with an acid or an acid solution. The acid reacts with the ammonia in the air and produces an ammonium product that separates from, or can be separated from, the air. The result is clean air having most or substantially all of the ammonia removed. As shown in FIG. 2, the apparatus 12 includes a supply line 22 feeding an acid solution to the interior 16 of the reactor 14. The acid solution is supplied from a storage tank (not shown) or other suitable structure.

In certain embodiments, the reactor includes a structure for increasing the surface area of the acid solution which contacts the air. Many examples of such structures are known for gas/liquid chemical reactors. In the apparatus shown, the reactor 14 includes a nozzle assembly 24 near the top of the reactor which sprays the acid solution down through the interior 16 of the reactor. After being sprayed down through the air in the interior 16, the acid solution 26 collects in a pool in the bottom of the reactor.

The acid can be any type suitable for reacting with the ammonia in the air to produce an ammonium product. In certain embodiments, the acid is in the form of an aqueous solution. For example, the acid solution may be an inorganic acid. Some examples of inorganic acids that may be used include sulfuric acid, hydrochloric acid, phosphoric acid, sulfamic acid, nitric acid, hydrofluoric acid, or mixtures of these acids. The acid solution can have any suitable strength; for example, it may be 0.5% to 50% sulfuric acid. The sulfuric acid solution reacts with the gaseous ammonia and produces crystals of ammonium sulfate. Other types of acids may produce ammonium sulfate or other ammonium salts.

The acid solution may also be an aqueous solution of an acid salt that produces an acid in solution. For example, the alkali metal salts of inorganic acids convert to acids when hydrated with sufficient water. Some examples of alkali metals include sodium, potassium and lithium, and some examples of inorganic acids include sulfate, phosphate and nitrate. In certain embodiments, the alkali metal salts are alkali metal bisulfates which include, for example, sodium bisulfate, potassium bisulfate, or mixtures thereof.

An example of a sodium bisulfate that can be used is manufactured by Jones-Hamilton Co., 30354 Tracy Road, Walbridge, Ohio 43465. The sodium bisulfate is described in more detail in U.S. Pat. Nos. 5,707,658; 5,773,063; 5,958,491; 6,132,792; 6,620,445; 7,048,803; and 7,097,861 which are incorporated by reference herein. The Jones-Hamilton sodium bisulfate is in the form of dry granules that can be readily solubilized in aqueous media.

In certain embodiments, the apparatus also includes a device or material for separating the ammonium product from the acid solution after the reaction. For example, when the product is crystals of ammonium sulfate, the solid crystals are separated from the liquid acid solution. The separated ammonium sulfate can be collected and sold for use as fertilizer. The separation device or can be positioned either inside or outside the reactor depending on the particular design of the apparatus. In the embodiment shown, the separation device or material is indicated schematically at 28 as being positioned inside the pool of acid solution 26, although it is not shown. Alternatively, the acid solution still containing the ammonium sulfate crystals can be removed from the reactor through a pipe or other means, and the crystals separated from the solution at a location outside the reactor, and either inside or outside the house.

The separation device or material 28 can be any suitable device, material or structure for separating the ammonium product from the acid solution. For example, it can be any suitable type of solid-liquid separation device. Some general categories of devices that could be used operate by filtration, screening, sedimentation, centrifugation, hydrocycloning or flotation. In certain embodiments, the separation device is a filter. Many different types of filters are known, including continuous, semicontinuous and discontinuous filters. Some examples of continuous filters are drum filters, rotary disk filters, vacuum belt filters, and rotary disk or rotating cylinder cross-flow filters. Many different solid/liquid separation devices and processes are disclosed in Perry's Chemical Engineer's Handbook.

The apparatus 12 may also include a water supply line 29 for replenishing water that evaporates from the acid solution 26. The water supply line 29 can be connected to a water tank or pipeline (not shown) for supplying water.

In certain embodiments, the apparatus 12 includes a conduit 30 from the separation device or material 28 for a stream of the separated acid solution. The apparatus 12 may further include a storage tank 32 for the acid solution connected to the conduit. The storage tank 32 may be located inside our outside the animal house. In certain embodiments, the apparatus includes a structure (not shown) for recycling the acid solution.

In certain embodiments, the apparatus also includes a storage tank 34 for collecting the ammonium product after it has been separated. The storage tank 34 may be located inside our outside the animal house. The apparatus may further include a conduit 36 for a stream of the ammonium salt from the separation device or material 28 to the storage tank 34. The conduit would extend to the separation device (not shown).

In other embodiments, the reaction of the acid solution with the ammonia is controlled so that the reaction product remains in solution and is not separated as crystals. For example, this may be accomplished by controlling the acid strength of the solution. In a particular example, the acid strength of a sulfuric acid solution is controlled so that the reaction with ammonia-containing air produces a concentrated solution of ammonium sulfate, not ammonium sulfate crystals. This concentrated solution could be collected and marketed as fertilizer, or it could be cleaned up for other uses.

The apparatus 12 can also be equipped with pumps, valves, or any other devices (not shown) necessary for its operation.

FIG. 3 shows an alternative embodiment of an apparatus 42 for removing ammonia from the air according to the invention. The apparatus includes a reactor 44 having an interior 46. A demister pad 47 is positioned in the top of the reactor. A fan 48 draws ammonia-containing air from inside the animal house and propels it through a duct 50 into the reactor 44. The air flows upward through the interior 46 of the reactor 44 and exits the open top 51 of the reactor after it has reacted with the acid solution.

An acid solution is fed through a supply line 52 and a nozzle 54 into the top of the reactor 44. The reactor 44 includes a pack section 55 positioned below the nozzle 54. The pack section 55 can be any structure that increases the surface area of the acid solution as it drops down from the nozzle through the pack section. After reacting with the air, the acid solution 56 collects in the bottom of the reactor.

The apparatus 42 includes a device or material 58 for separation the ammonium product from the acid solution. The apparatus also includes a water supply 59 for replenishing water that evaporates from the solution. A conduit 60 leads from the acid solution 56 to a storage tank (not shown).

The present invention also relates to a method for removing ammonia from air in an animal house. The method includes removing ammonia from the air with an apparatus positioned inside the animal house. After the ammonia is removed, the clean air is returned inside the animal house.

In certain embodiments, the method includes flowing air with ammonia into contact with an acid solution in a reactor, so that the ammonia is removed from the air by reaction with the acid to form an ammonium product. The air with ammonia and the acid solution may be contacted in any suitable manner for reaction.

The method may also include separating the ammonium product from the acid solution. In certain embodiments, the method includes flowing a stream of the separated acid solution to a storage tank. Also, in certain embodiments, the method includes recycling the separated acid solution to the reactor. The method may also include flowing a stream of the separated ammonium product to a storage device.

The principle and mode of operation of this invention have been explained and illustrated in its preferred embodiment. However, it must be understood that this invention may be practiced otherwise than as specifically explained and illustrated without departing from its spirit or scope.

What is claimed is:

1. An animal house having ammonia control apparatus comprising:
    an animal house which is a building structured for housing one or more animals; and
    apparatus positioned inside the animal house for removing ammonia from air, and then returning the air inside the animal house.

2. The animal house of claim 1, wherein the ammonia removal includes producing an ammonium product.

3. The animal house of claim 1, wherein the ammonia removal includes contacting the air with an acid, reacting the acid with the ammonia, and producing an ammonium salt.

4. The animal house of claim 3, wherein the apparatus includes a device or material for separating the ammonium salt from the acid.

5. The animal house of claim 3, wherein the apparatus includes a structure for recovering the ammonium salt in solution with the acid.

6. The animal house of claim 1, wherein the apparatus includes a device for increasing flow of air through the apparatus.

7. The animal house of claim 1, wherein the apparatus includes a structure for increasing surface area of the acid contacting the air.

8. The animal house of claim 1, wherein the acid is in the form of an aqueous acid solution, and wherein the apparatus includes a water supply for replenishing water evaporated from the solution.

9. The animal house of claim 7, wherein the acid solution is a sulfuric acid solution, and wherein the ammonium product is ammonium sulfate.

10. The animal house of claim 1, wherein the apparatus is effective to control ammonia in the air to a level not greater than 25 ppm.

11. The animal house of claim 9, wherein the apparatus includes storage of the recovered ammonium sulfate.

12. The animal house of claim 1, wherein the apparatus includes a reactor for reacting the acid with the ammonia.

13. The animal house of claim 1, wherein the apparatus includes a storage container of the acid outside the reactor.

14. The animal house of claim 1, wherein the animal house includes multiple apparatuses for removing ammonia positioned inside the animal house.

15. A method for removing ammonia from air in an animal house, the method comprising:
    removing ammonia from air with an apparatus positioned inside the animal house; and then
    returning the air with ammonia removed inside the animal house.

16. The method of claim 15, wherein the ammonia removal includes producing an ammonium product.

17. The method of claim 16, wherein the ammonia removal includes contacting the air with an acid solution, reacting the acid solution with the ammonia, and producing an ammonium salt.

18. The method of claim 17, which further includes increasing surface area of the acid solution which contacts the air.

19. The method of claim 17, which further includes recovering a solution of the ammonium salt in the acid solution after the reaction.

20. The method of claim 15, wherein ammonia in the air is controlled to a level not greater than 25 ppm.

* * * * *